(12) United States Patent
Soeger et al.

(10) Patent No.: US 8,926,925 B2
(45) Date of Patent: Jan. 6, 2015

(54) SCR CATALYTIC CONVERTER HAVING IMPROVED HYDROCARBON RESISTANCE

(75) Inventors: Nicola Soeger, Nidderau (DE); Katja Adelmann, Darmstadt (DE); Michael Seyler, Rodenbach (DE); Thomas R. Pauly, Clarkston, MI (US); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 14/002,581

(22) PCT Filed: Mar. 1, 2012

(86) PCT No.: PCT/EP2012/053487
§ 371 (c)(1),
(2), (4) Date: Sep. 3, 2013

(87) PCT Pub. No.: WO2012/117041
PCT Pub. Date: Sep. 7, 2012

(65) Prior Publication Data
US 2013/0336863 A1    Dec. 19, 2013

(30) Foreign Application Priority Data
Mar. 3, 2011    (EP) .................................... 11001789

(51) Int. Cl.
| | | |
|---|---|---|
| B01D 53/94 | (2006.01) | |
| F01N 3/28 | (2006.01) | |
| B01J 29/00 | (2006.01) | |
| B01J 29/12 | (2006.01) | |
| B01J 37/02 | (2006.01) | |
| B01J 29/068 | (2006.01) | |
| B01J 29/072 | (2006.01) | |
| B01J 29/076 | (2006.01) | |
| B01J 29/76 | (2006.01) | |
| B01J 29/80 | (2006.01) | |
| B01J 33/00 | (2006.01) | |
| B01J 35/02 | (2006.01) | |
| B01J 29/18 | (2006.01) | |
| B01J 29/46 | (2006.01) | |
| B01J 29/78 | (2006.01) | |
| F01N 3/20 | (2006.01) | |
| B01J 29/65 | (2006.01) | |

(52) U.S. Cl.
CPC ........... $B01J\ 29/126$ (2013.01); $B01D\ 53/9418$ (2013.01); $B01J\ 37/0244$ (2013.01); $B01J\ 37/0246$ (2013.01); $B01J\ 29/068$ (2013.01); $B01J\ 29/072$ (2013.01); $B01J\ 29/076$ (2013.01); $B01J\ 29/7615$ (2013.01); $B01J\ 29/80$ (2013.01); $B01J\ 33/00$ (2013.01); $B01J\ 35/023$ (2013.01); $B01J\ 29/185$ (2013.01); $B01J\ 29/46$ (2013.01); $B01J\ 29/7838$ (2013.01); $B01D\ 2251/2062$ (2013.01); $B01D\ 2255/206$ (2013.01); $B01D\ 2255/50$ (2013.01); $B01D\ 2255/9022$ (2013.01); $B01D\ 2255/9205$ (2013.01); $B01D\ 2258/012$ (2013.01); $F01N\ 3/2066$ (2013.01); $F01N\ 2610/02$ (2013.01); $B01J\ 29/65$ (2013.01); $Y02T\ 10/24$ (2013.01); $Y10S\ 502/52712$ (2013.01)
USPC .................. 423/213.2; 423/213.7; 423/239.1; 423/239.2; 60/274; 60/299; 60/301; 502/60; 502/64; 502/65; 502/73; 502/300; 502/304; 502/349; 502/355; 502/527.12

(58) Field of Classification Search
CPC ............ B01J 21/06; B01J 23/10; B01J 23/14; B01J 29/00; B01J 29/005; B01J 53/94; B01J 53/9418; B01J 53/9422
USPC ........... 502/60, 64, 65, 67, 73, 300, 304, 349, 502/355, 527.12; 423/213.2, 213.7, 239.1, 423/239.2; 60/274, 299, 301
See application file for complete search history.

(56) References Cited

U.S. PATENT DOCUMENTS

| | | |
|---|---|---|
| 5,077,253 A | 12/1991 | Chu et al. |
| 5,179,054 A | 1/1993 | Schipper et al. |
| 5,228,980 A | 7/1993 | Stockwell et al. |
| 6,677,264 B1 * | 1/2004 | Klein et al. ..................... 502/74 |

(Continued)

FOREIGN PATENT DOCUMENTS

| | | |
|---|---|---|
| EP | 1 054 722 A1 | 11/2000 |
| EP | 1 147 801 | 10/2001 |

(Continued)

OTHER PUBLICATIONS

International Search Report for Application No. PCT/EP2012/053487 dated Apr. 19, 2012 (in English).

*Primary Examiner* — Timothy Vanoy
(74) *Attorney, Agent, or Firm* — Smith, Gambrell & Russell LLP

(57) ABSTRACT

A catalyst for the selective catalytic reduction of nitrogen oxides in diesel engine exhaust gases using ammonia or a precursor compound decomposable to ammonia. The catalyst includes two superposed coatings applied to a support body, of which the first coating applied directly to the support body includes a transition metal-exchanged zeolite and/or a transition metal-exchanged zeolite-like compound, and effectively catalyzes the SCR reaction. The second coating is applied to the first coating to cover it on the exhaust gas side and prevent hydrocarbons having at least three carbon atoms present in the exhaust gas from contacting the first coating, without blocking the passage of nitrogen oxides and ammonia to the first coating. The second coating may be formed from small-pore zeolites and/or small-pore, zeolite-like compounds, and from suitable oxides, especially silicon dioxide, germanium dioxide, aluminum oxide, titanium dioxide, tin oxide, cerium oxide, zirconium dioxide and mixtures thereof.

15 Claims, 8 Drawing Sheets

(56) References Cited

U.S. PATENT DOCUMENTS

Figure 1:
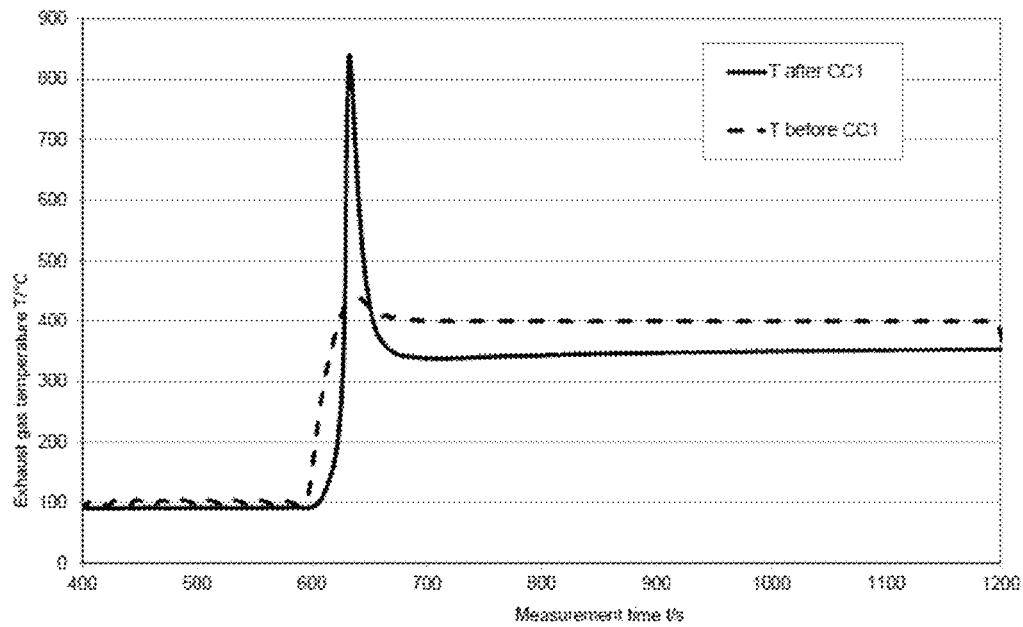

| | | |
|---|---|---|
| 6,843,971 B2 | 1/2005 | Schäfer-Sindlinger et al. |
| 6,936,737 B2 | 8/2005 | De Angelis et al. |
| 8,226,896 B2 | 7/2012 | Pfeifer et al. |
| 8,480,986 B2 | 7/2013 | Andreasson et al. |
| 2004/0258594 A1 | 12/2004 | Andreasson et al. |
| 2005/0196333 A1 | 9/2005 | Schäfer-Sindlinger et al. |
| 2006/0029535 A1 | 2/2006 | Ott |
| 2009/0240008 A1 | 9/2009 | Simon |
| 2010/0077738 A1 | 4/2010 | Cavataio et al. |
| 2010/0290963 A1 | 11/2010 | Andersen et al. |
| 2011/0056187 A1 | 3/2011 | Seyler et al. |
| 2011/0247495 A1 | 10/2011 | Marco et al. |
| 2011/0305612 A1* | 12/2011 | Muller-Stach et al. ....... 423/212 |
| 2012/0275977 A1* | 11/2012 | Chandler et al. ............ 423/213.5 |
| 2013/0089481 A1* | 4/2013 | Sumiya et al. ............. 423/213.5 |

FOREIGN PATENT DOCUMENTS

| | | |
|---|---|---|
| EP | 1 054 722 B1 | 12/2001 |
| EP | 1 961 933 | 8/2008 |
| WO | 99/39809 A1 | 8/1999 |
| WO | 02/20458 | 3/2002 |
| WO | 2009/135588 A1 | 11/2009 |

* cited by examiner

SCR CATALYTIC CONVERTER HAVING IMPROVED HYDROCARBON RESISTANCE

The invention relates to a catalyst for the selective catalytic reduction of nitrogen oxides in the exhaust gases of diesel engines, which features improved resistance to the hydrocarbons likewise present in the diesel exhaust gas, and to the production and use thereof for cleaning diesel exhaust gases, especially in automotive applications.

As well as the carbon, monoxide (CO) and hydrocarbon (HC) pollutant cases resulting from incomplete combustion of the fuel, the exhaust gas of diesel engines comprises soot particles (PM) and nitrogen oxides ($NO_x$). In addition, the exhaust gas of diesel engines contains up to 15% by volume of oxygen. It is known that the oxidizable CO and HC pollutant gases can be converted to carbon dioxide ($CO_2$) by passage over a suitable oxidation catalyst, and particulates can be removed by passage of the exhaust gas through a suitable soot particle filter. Also well-known in the prior art are methodologies for removal of nitrogen, oxides from exhaust gases in the presence of oxygen. One of these "denoxing processes" is what is called the SCR process (SCR=selective catalytic reduction), i.e. the selective catalytic reduction of the nitrogen oxides with the reducing agent ammonia over a catalyst suitable therefor, the SCR catalyst. In this process, ammonia can be added to the exhaust gas stream as such or in the form of a precursor compound decomposable to ammonia under ambient conditions, "ambient conditions" being understood to mean the environment of the compound decomposable to ammonia in the exhaust gas stream upstream of the SCR catalyst. Performance of the SCR process requires a source for provision of the reducing agent, an injection apparatus for metered addition of the reducing agent into the exhaust gas as required, and an SCR catalyst disposed in the flow path of the exhaust gas. The entirety of a reducing agent source, SCR catalyst and injection apparatus disposed on the inflow side of the SCR catalyst is also referred to as an SCR system.

Given, the legal limits that will apply in future, an exhaust gas aftertreatment for removal of all pollutant gases emitted by the engine will generally be indispensible for all newly registered diesel vehicles. Thus, it will be necessary for the current applications for diesel exhaust gas aftertreatment to combine diesel oxidation catalyst, diesel particulate filter and SCR systems, and the combination, of these units will entail altered operating conditions for the SCR catalyst in particular. Currently, three systems of this kind are being tested: in the "SCRT® System" according to EP 1 054 722, a diesel oxidation catalyst, a diesel particulate filter and an SCR system are arranged in series in the flow direction of the exhaust gas. Alternatively, the SCR system may be arranged between a close-coupled diesel oxidation catalyst and a diesel particulate filter in the underbody of the motor vehicle (DOC-SCR-DPF) or upstream of a unit composed of diesel oxidation catalyst and diesel particulate filter (SCR-DOC-DPF).

The combination of diesel particulate filter and SCR system in an exhaust gas line means that the SCR catalyst, at particular operation points, is exposed to significantly higher HC concentrations for a prolonged, period than was the case in existing applications. There are several causes for these increased HC concentrations:

Firstly, the in-engine combustion is now no longer calibrated with the aim of dispensing with costly exhaust gas aftertreatment stages but from the point of view of power optimization, with equal tolerance of particulates and HCs and of nitrogen oxides as emissions. This causes a certain base level of HC pollution of the exhaust gas aftertreatment system, the exhaust gas already having much higher HC concentrations than in the applications customary to date in which SCR systems were used. Secondly, the diesel particulate filter has to be regenerated at regular intervals, and one way in which this is accomplished is by controlled burnoff of the particulate load. For this purpose, the filter has to be heated to a temperature above the soot ignition temperature. This heat-up is effected by postinjection of fuel into the output piston stroke of the cylinder or into the exhaust gas line, and by catalytic conversion of the uncombusted hydrocarbons on an oxidizing catalyst (called "heat-up catalyst"). Usually, an upstream diesel oxidation catalyst assumes the function of the "heat-up catalyst". If this is absent, the SCR catalyst may in some cases also assume "heat-up" functions. In each case, there are higher HO concentrations upstream of the SCR catalyst during the filter regeneration, since the hydrocarbons injected after ignition are not fully combusted catalytically during the "heat-up". In an SCRT® System in which diesel oxidation catalyst and diesel particulate filter are upstream of the SCR catalyst, after a certain service life, there is additionally permanent HC loading of the SCR catalyst attributable to the hydrothermal aging of the oxidation functions in diesel oxidation catalyst and in the optionally catalytically coated filter.

Independently of any regeneration of the diesel particulate filter, further heating measures may be necessary as a result of fuel postinjection, for example to compensate for cold-start delays, and lead to briefly drastically increased, HC concentrations upstream of the SCR catalyst.

The result of these effects is that the SCR catalyst in modern exhaust gas cleaning combination systems is exposed to altered operating conditions, the HC contents present in the exhaust gas upstream of the SCR catalyst being much, higher than in existing applications. Under these conditions, conventional SCR catalysts generally show a distinct drop in nitrogen oxide conversion performances compared to the activity thereof in exhaust gas which does not contain hydrocarbons. Recently, there have also been descriptions of hydrocarbon-resistant SCR catalysts in the prior art.

For instance, WO 2009/135588 discloses a process for treating diesel engine exhaust gases comprising nitrogen oxides ($NO_x$) and hydrocarbons (HC), comprising: a) the addition of ammonia ($NH_3$) as such or in the form of a compound which gives rise to ammonia under ambient conditions from a source which does not form part of the exhaust gas line to the exhaust gas stream comprising nitrogen oxides and hydrocarbons; and b) selective reaction of $NO_x$ with the $NH_3$ added to the exhaust gas stream over an SCR catalyst comprising a zeolite exchanged with copper (Cu) and/or iron (Fe), which is characterized in that the hydrocarbons present in the exhaust gas are kept away from the active sites in the catalyst over which the reactions take place by the molecular sieve-like action, of the zeolite. The zeolites used are small-pore zeolites, especially ferrierite, chabazite and erionite, into which the hydrocarbons cannot penetrate because of their size.

These hydrocarbon-resistant SCR catalysts feature a much smaller fall in the nitrogen oxide conversion activity thereof in the hydrocarbon-containing exhaust gas compared to the activity thereof in the hydrocarbon-free exhaust gas. However, the nitrogen oxide conversions achievable with these catalysts even in hydrocarbon-free exhaust gas are significantly poorer overall than the conventional SCR catalysts. The hydrothermal aging stability of these HC-resistant catalysts is also often significantly inferior to the hydrothermal aging stability of conventional SCR catalysts.

An elevated content of hydrocarbons in the exhaust gas to be cleaned also usually has an adverse effect on the long-term stability of the SCR catalysts. This is especially true of conventional SCR catalysts, the functionality of which is based on the SCR activity of transition metal-exchanged zeolites with moderate or larger pore sizes, for example mordenite, β-zeolite, USY, ZSM-5 or ZSM-20, since these hydrocarbons can be stored in the zeolite skeleton from the exhaust gas. The hydrocarbons present in the exhaust gas are stored in the zeolite skeleton in competition with ammonia at comparatively cold operating temperatures. If the catalyst is then exposed to elevated operating temperatures above the light-off temperature for the catalytic hydrocarbon oxidation, the hydrocarbons stored "burn" in the zeolite. The reaction enthalpy released then produces considerable exothermicity in the catalyst, and the corresponding temperature rise can lead to considerable damage to the catalytically active sites in the zeolitic catalyst.

It is an object of the present invention to provide SCR catalysts which feature improved HC resistance compared to conventional zeolite-based SCR catalysts, but which simultaneously have a higher SCR activity before and after hydrothermal aging than HC-resistant SCR catalysts according to the prior art.

The object is achieved by a catalyst for the selective catalytic reduction of nitrogen oxides with ammonia in exhaust gases comprising hydrocarbons, comprising
  a support body;
  a first catalytically active coating which has been applied directly to the support body and comprises a zeolite exchanged with one or more transition metals and/or a zeolite-like compound exchanged with one or more transition metals, and
  a second coating which covers the first coating on the exhaust gas side and is configured so as to prevent the contact of hydrocarbons having at least three carbon atoms present in the exhaust gas with the first coating beneath, without blocking the passage of nitrogen oxides and ammonia to the first coating, and comprises one or more small-pore zeolites and/or small-pore zeolite-like compounds selected from the group consisting of SAPO-34, CHA, FER, ERI, OFF, ALPO-34 and mixtures thereof or one or more oxides selected from the group consisting of silicon dioxide, germanium dioxide, aluminum oxide, titanium dioxide, tin oxide, cerium oxide, zirconium dioxide and mixed oxides thereof.

"Zeolite-like compounds" in the context of this document are understood to mean those which form a typical zeolite structure ("zeolite skeleton") but are not formed or are not formed exclusively from aluminum silicate. These include especially silicon aluminum phosphates (SAPOs) and aluminum phosphates (ALPOs).

The first catalytically active coating applied directly to the support body in the inventive catalyst catalyzes the reaction of nitrogen oxides with ammonia. It preferably comprises a transition metal-exchanged zeolite and/or a transition metal-exchanged zeolite-like compound selected from the group consisting of β-zeolite, ZSM-5, ZSM-20, USY, MOR or mixtures thereof. Particular preference is given to β-zeolite, USY and MOR. The transition metal present in the zeolite or in the zeolite-like compound is preferably selected from the group consisting of cerium, manganese, iron, copper, silver, gold, platinum, palladium and/or mixtures thereof. Very particular preference is given to cerium, iron and copper.

The second coating preferably fully covers the first coating on the exhaust gas side. However, the inventive effect also occurs when the coverage is merely almost complete. More particularly, the coverage of the first coating by the second coating is thus 90 to 100%, more preferably 95 to 100%, based in each case on the area of the first coating.

Preferred small-pore zeolites which may be present in the second coating are SAPO-34, CHA and FER.

The small-pore zeolites which may be present in the second coating have preferably been exchanged with one or more transition metals selected from the group consisting of cerium, manganese, iron, copper, silver, gold, platinum, palladium and/or mixtures thereof. Particular preference is given to cerium, iron and copper.

In one embodiment of the present invention, the second coating consists of one or more small-pore zeolites and/or small-pore zeolite-like compounds selected from the group consisting of SAPO-34, CHA, FEE, ERI, OFF, ALPO-34 and mixtures thereof.

If the second coating comprises or consists of small-pore zeolites, it may itself have SCR-catalytic activity.

Preferred oxides which may be present in the second layer are silicon dioxide, titanium dioxide, aluminum oxide and cerium oxide, most preferably silicon dioxide. In order to ensure sufficient porosity of this layer and hence sufficient passage capacity for the ammonia and nitrogen oxide reactants with simultaneously adequate barrier action with respect to the hydrocarbons present in the exhaust gas, the $d_{50}$ of the oxides in the second coating is preferably equal to or less than 100 nm, more preferably equal to or less than 70 nm. In this context, the $d_{50}$ of the particle size distribution of the oxides is understood to mean that 50 of the total volume of the oxides contains only those particles whose diameter is less than or equal to the value reported to as $d_{50}$.

In one embodiment of the present invention, the second coating consists of one or more oxides selected from the group consisting of silicon dioxide, germanium dioxide, aluminum oxide, titanium dioxide, tin oxide, cerium oxide, zirconium dioxide and mixtures thereof.

If the second coating comprises oxides or consists of oxides, it can be produced by suspending a suitable oxide in water, optionally establishing the abovementioned preferred particle size distribution of the oxides in suspension by grinding, and then coating a support body already provided with the first layer with this suspension by a conventional dipping, suction or pumping process known to those skilled in the art.

According to the invention, preference is given to oxides which have no long-range order, i.e. are in amorphous form.

Accordingly, the second coating of the inventive catalyst is preferably produced in a process comprising the impregnation of a support body already provided with the first coating with a solution comprising one or more alkoxides of the formula (I)

in which
n is 3 or 4 and m<n;
Me is silicon, germanium, aluminum, titanium, tin or zirconium;
R is $(C_1-C_4)$-alkyl or phenyl; and
R' is $(C_1-C_8)$-alkyl, amino-$(C_1-C_4)$-alkyl, amino-$(C_1-C_4)$-alkyl whose amino group has been substituted by amino-$(C_1-C_4)$-alkyl, or $(C_1-C_4)$-alkyl methacrylate, and then drying.

The oxides are formed by hydrolysis of the alkoxides and condensation of the hydrolysis products to form Me—O chains and networks, from which the oxides are ultimately formed.

Advantageously, the drying is followed by a calcination.

The abovementioned alkyl groups may be straight-chained or branched and may, for example, be methyl, ethyl, n-propyl, i-propyl, n-butyl or i-butyl. ($C_1$-$C_8$)-alkyl may additionally, for example, also be pentyl, hexyl, heptyl or octyl.

R is preferably methyl, ethyl, isopropyl, butyl or phenyl.

R' is preferably amino-($C_1$-$C_4$)-alkyl, especially aminomethyl and aminoethyl, N-(2-aminoethyl)-3-aminopropyl, isopropyl, isobutyl, phenyl, octyl or ($C_1$-$C_4$)-alkyl methacrylate, especially methyl methacrylate, ethyl methacrylate or propyl methacrylate.

More preferably, is silicon. The alkoxides of the formula (I) used in this case are especially tetraethoxysilane, diisobutyldimethoxysilane, N-(2-amino-ethyl)-3-aminopropyltrimethoxysilane, phenyltriethoxysilane, methacryloyloxypropyltrimethoxysilane and triethoxyoctylsilane.

Embodiments of the inventive catalyst are of particularly good suitability for automotive applications and are additionally inexpensive to produce—even by above-outlined processes—when the second coating consists of silicon dioxide.

Inventive catalysts whose second coating consists of silicon dioxide may, alternatively to the manner described above, also be prepared by applying an aqueous suspension of fumed silica to a support body already provided with the first zeolitic coating. In this case, a fumed silica having primary particles having a $d_{50}$ of the particle size distribution equal to or less than 100 nm, preferably equal to or less than 70 nm and more preferably equal to or less than 50 nm should be selected. The $d_{50}$ of the particle size distribution is understood to mean here that 50% of the total volume of the fumed silica contains only those particles whose diameter is less than or equal to the value reported as $d_{50}$. Fumed silicas preferred for use in this process have a halide- and/or hydroxide-modified surface, the functionality of which helps to produce crosslinking of the silica particles in the resulting layer by hydrolysis and/or condensation during or optionally after the application of the aqueous suspension of the silica.

The inventive catalyst in all its above-described and further conceivable embodiments is suitable for reducing the level of nitrogen oxides, comprising nitrogen monoxide and nitrogen dioxide, in hydrocarbon-containing diesel engine exhaust gases. For this purpose, the exhaust gas which comprises nitrogen oxides and hydrocarbons and is to be cleaned, after addition of ammonia or of a precursor compound decomposable to ammonia as a reducing agent, is passed over an inventive SCR catalyst. Preferably, the exhaust gas which comprises nitrogen oxides and hydrocarbons and is to be cleaned, before the addition of ammonia or of a precursor compound decomposable to ammonia, is passed over an oxidation catalyst which is effective for conversion of at least some of the nitrogen monoxide present in the exhaust gas to nitrogen dioxide. Ideally, the result of this is that the nitrogen oxides in the exhaust gas to be cleaned, before entry into the SCR catalyst, have a nitrogen dioxide content of 30 to 70%. In this case, the oxidation catalyst may be in the form of a catalytically active coating on a monolithic flow honeycomb and/or on a wall flow filter substrate.

Figure 2:
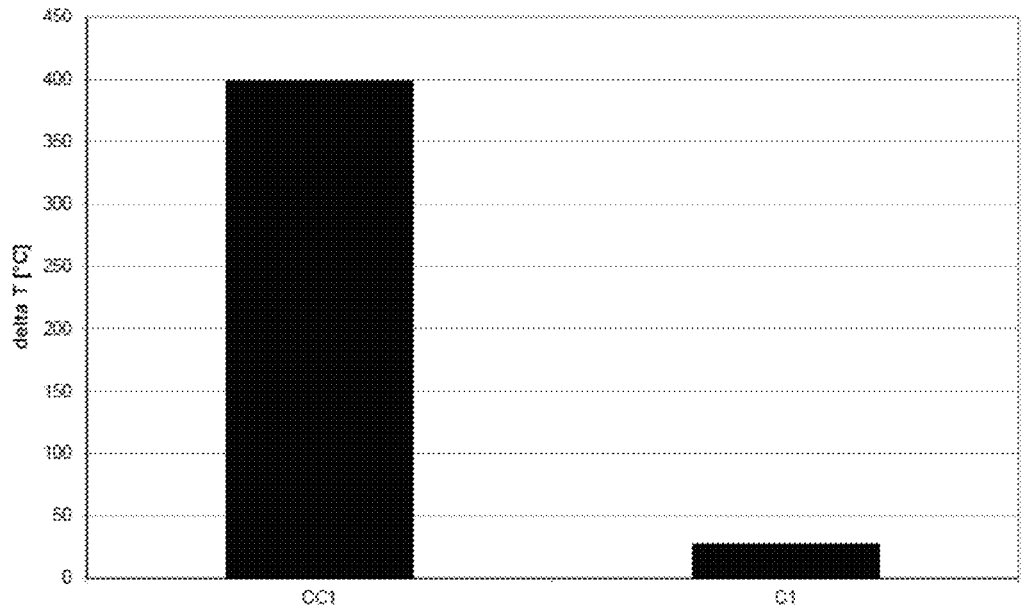
Figure 3:
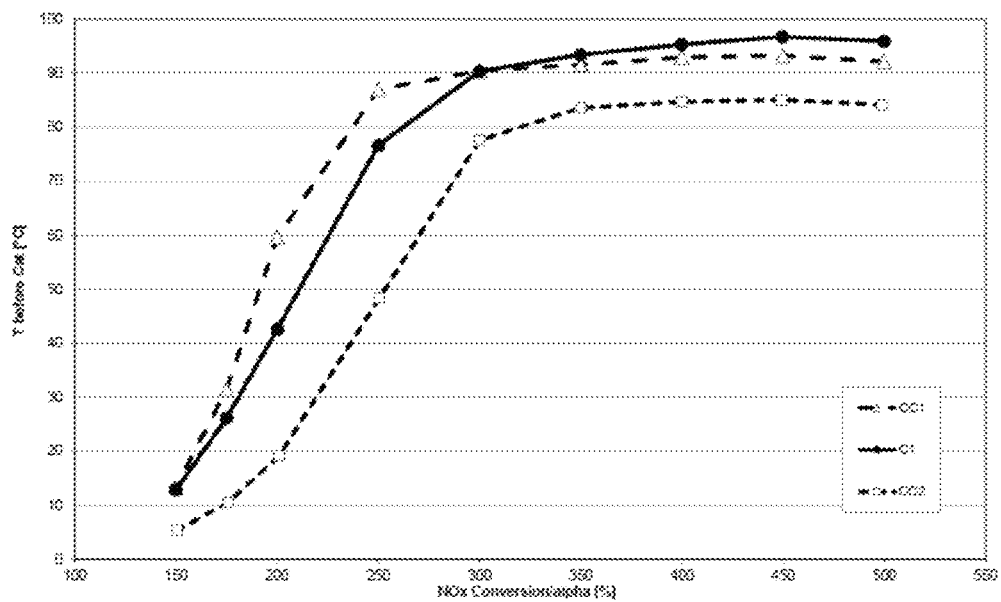
Figure 4:
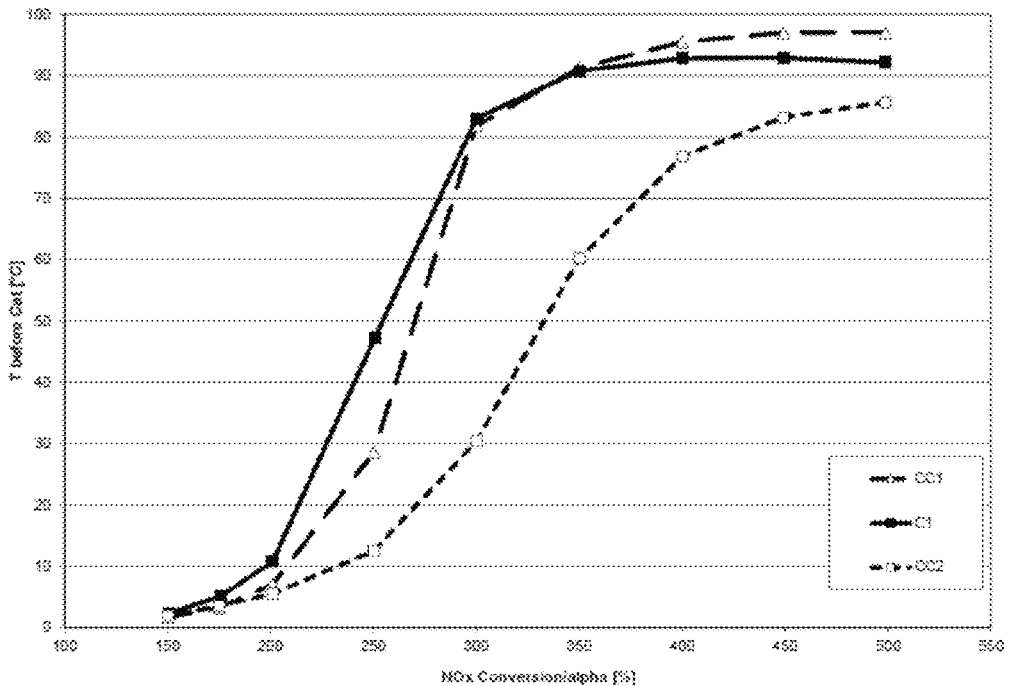
Figure 5:
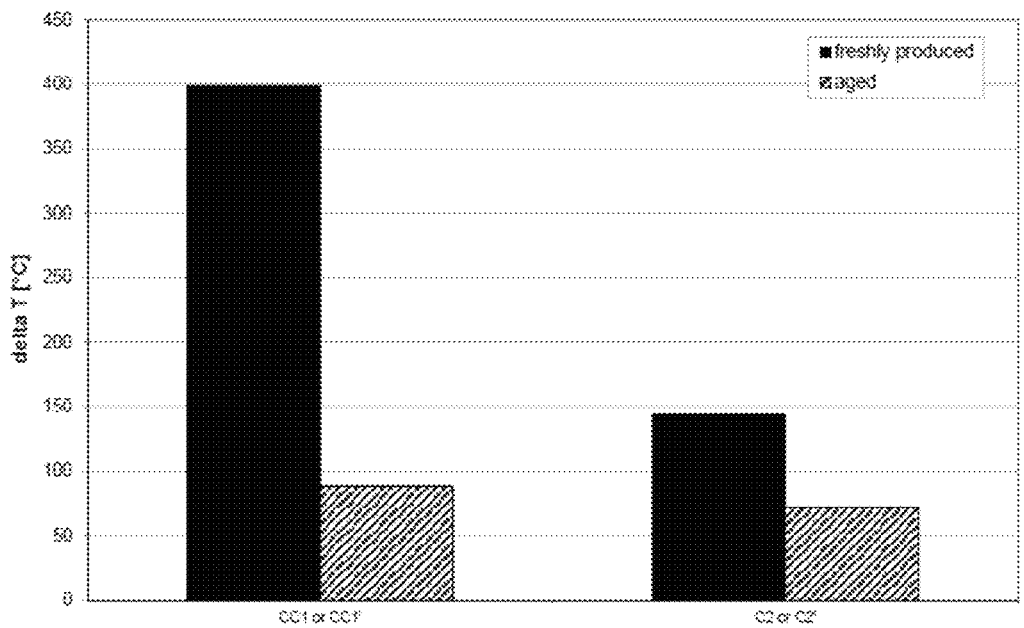
Figure 6:
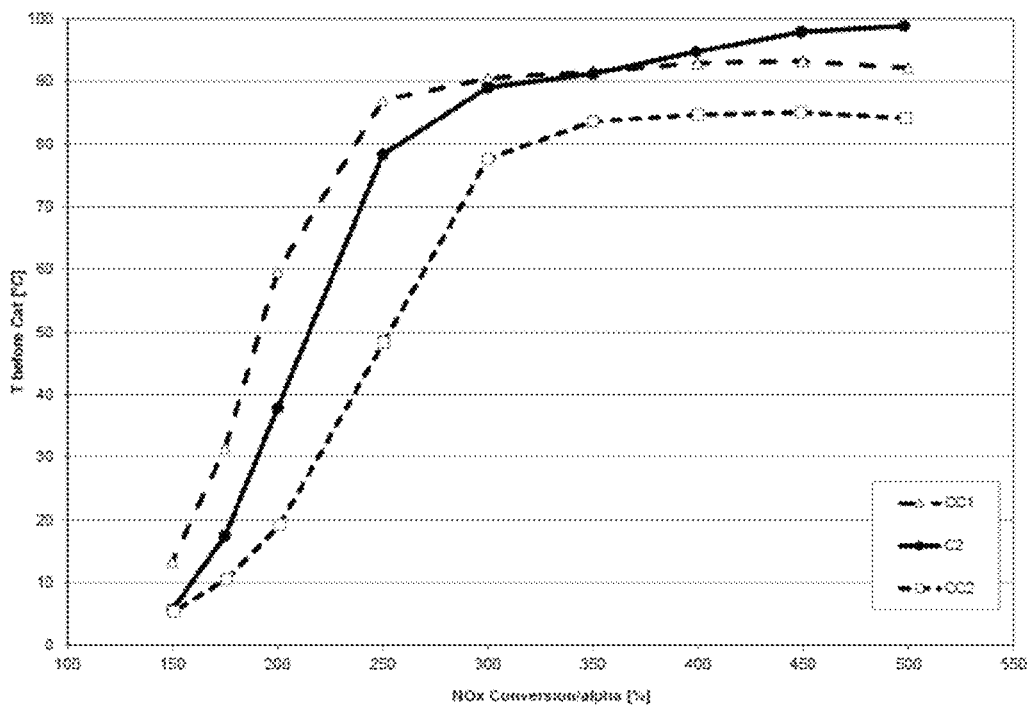
Figure 7:
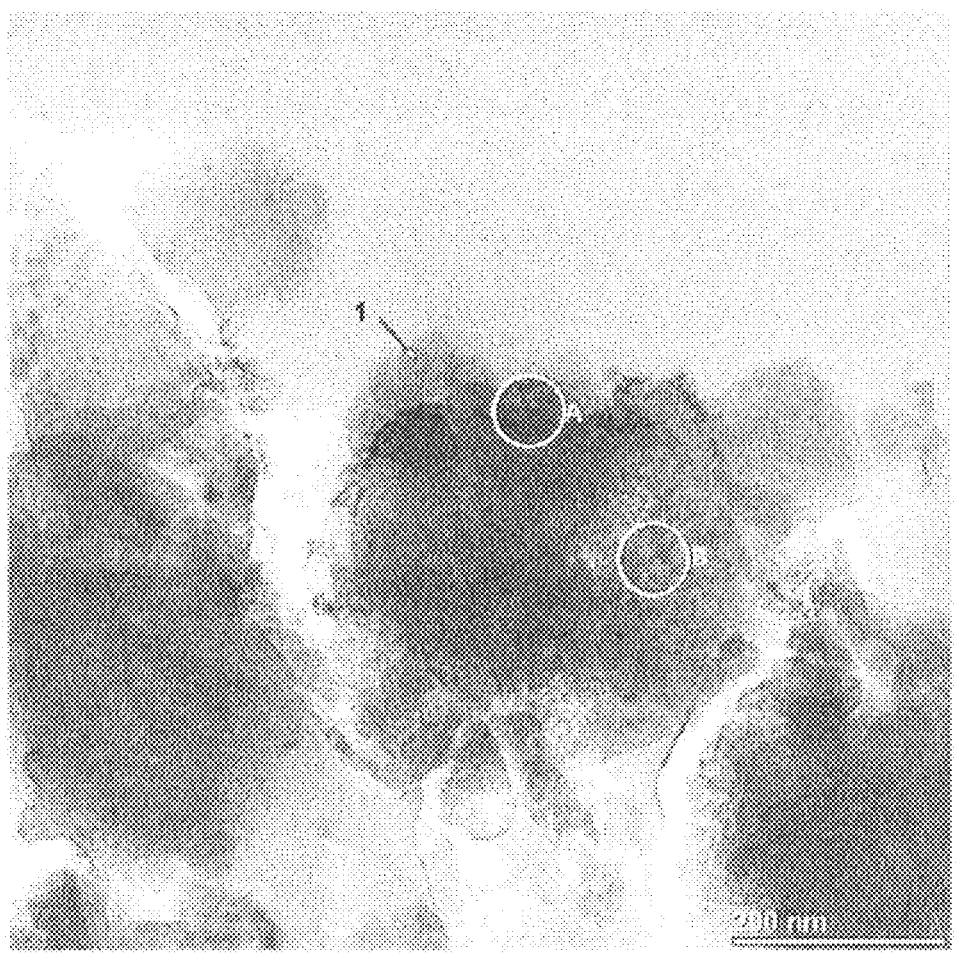
Figure 8:
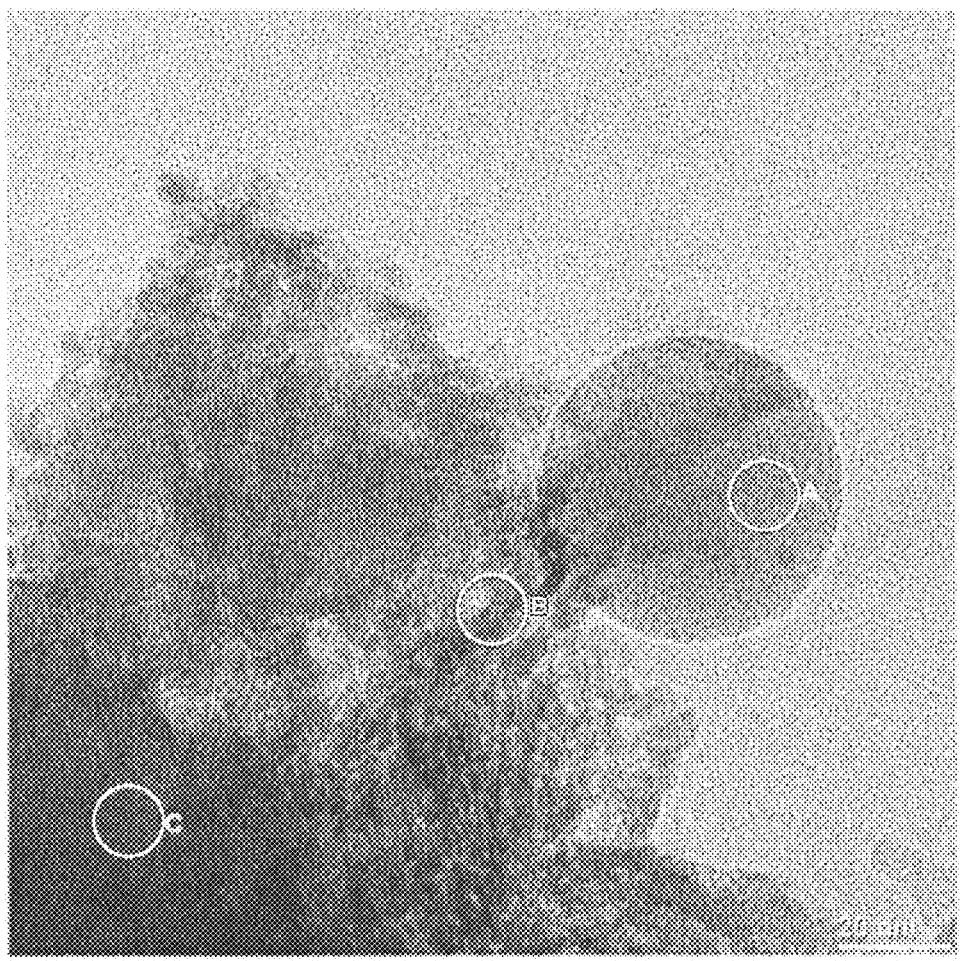

The invention is described in more detail hereinafter with reference to some examples and figures. The figures show:

FIG. 1: the exhaust gas temperature upstream and downstream of an SCR catalyst according to the prior art (CC1), which has been laden with hydrocarbons before commencement of the measurements: the raising of the reactor temperature/temperature upstream of catalyst to 400° C. leads to a distinct exotherm caused by HC burnoff;

FIG. 2: the temperature difference ΔT between the temperature upstream of catalyst and the temperature downstream of catalyst when the catalyst has been laden with hydrocarbons before commencement of the measurement, after raising the reactor temperature/temperature upstream of catalyst to 400° C.: comparison of the exotherm produced by HC burnoff over the inventive catalyst C1 and a catalyst according to the prior art (CC1);

FIG. 3: the $NO_x$ conversion normalized to the α value over the freshly produced catalysts CC1, CC2 (both prior art) and C1 (inventive) in the non-hydrocarbon-containing exhaust gas;

FIG. 4: the $NO_x$ conversion normalized to the α value over the hydrothermally aged catalysts CC1', CC2' (both prior art) and C1' (inventive) in the non-hydrocarbon-containing exhaust gas;

FIG. 5: the temperature difference ΔT between the temperature upstream of catalyst and the temperature downstream of catalyst when the catalyst has been laden with hydrocarbons before commencement of the measurement, after raising the reactor temperature/temperature upstream of catalyst to 400° C.: comparison of the exotherm produced by HC burnoff over the inventive catalyst C2 (freshly prepared) or C2' (hydrothermally aged) and a catalyst according to the prior art (CC1 or CC1');

FIG. 6: the $NO_x$ conversion normalized to the α value over the freshly produced catalysts CC1, CC2 (both prior art) and C1 (inventive) in the non-hydrocarbon-containing exhaust gas;

FIG. 7: a TEM image of a sample of the inventive catalyst C4, in which the three-dimensional arrangement of the components of the catalytically active material relative to one another is evident:

1: spherical $SiO_2$ particles
A: iron-exchanged zeolite
B: iron oxide formed from excess iron present in the material FIG. 8: a TEM image of a sample of the catalytically active material in the inventive catalyst C4: in the area around A delimited by the circle, $SiO_2$ is evident, which features no long-range order (crystal lattice planes) and is thus amorphous.

Figure 9:
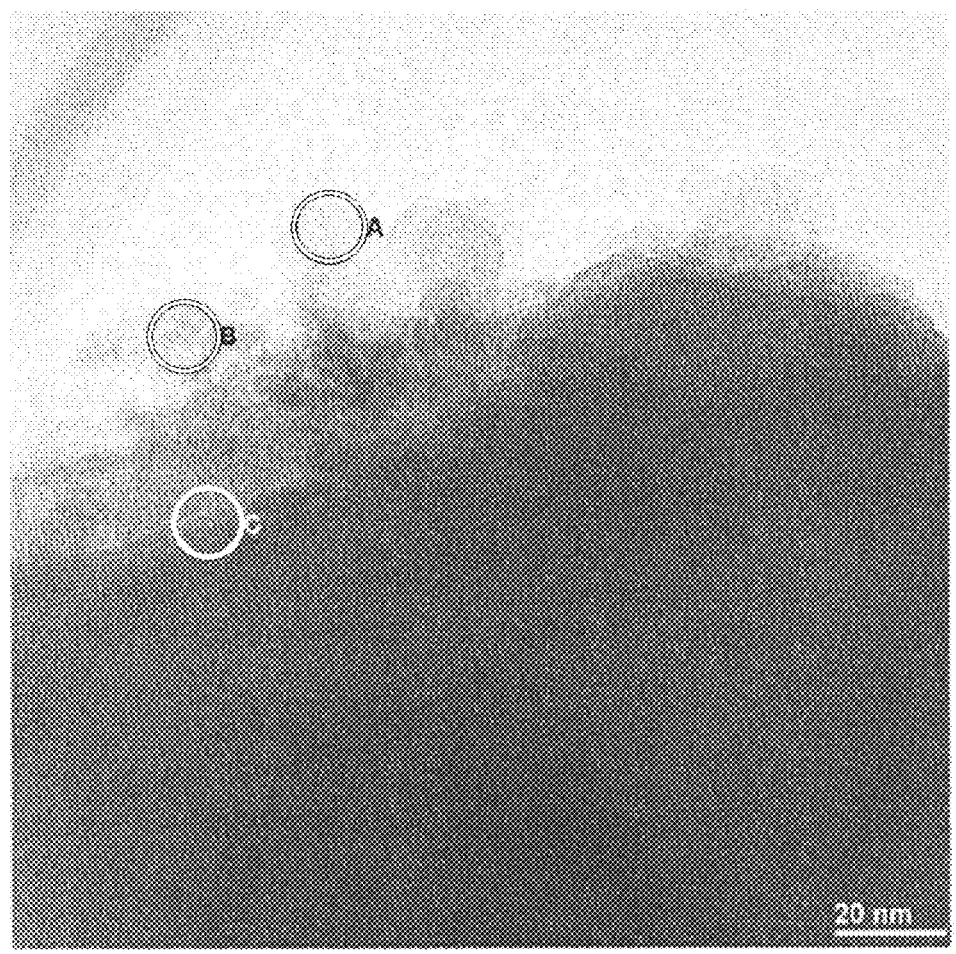

FIG. 9: a TEM image of a sample of the catalytically active material in the inventive catalyst C4: in the region around C, iron-exchanged zeolite is evident, having crystal lattice planes with a lattice plane spacing of about 1.1 nm.

Figure 10:
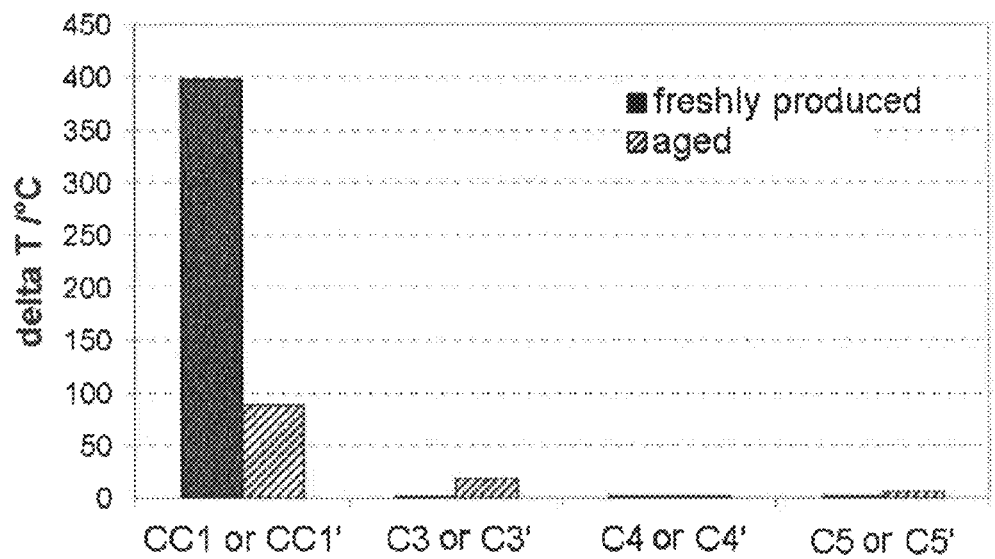
Figure 11:
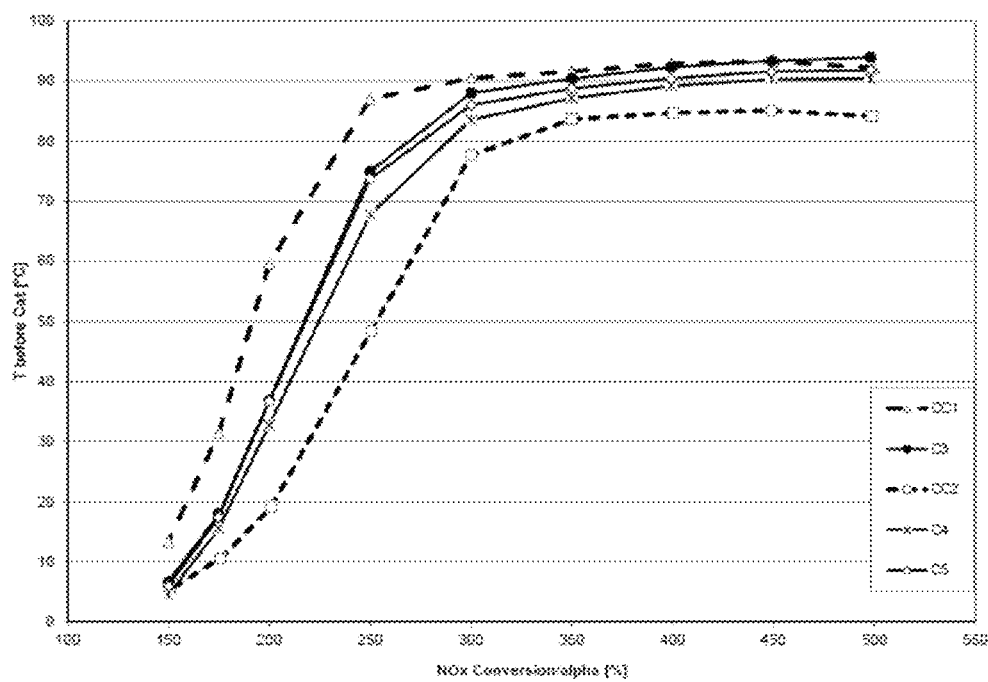
Figure 12:
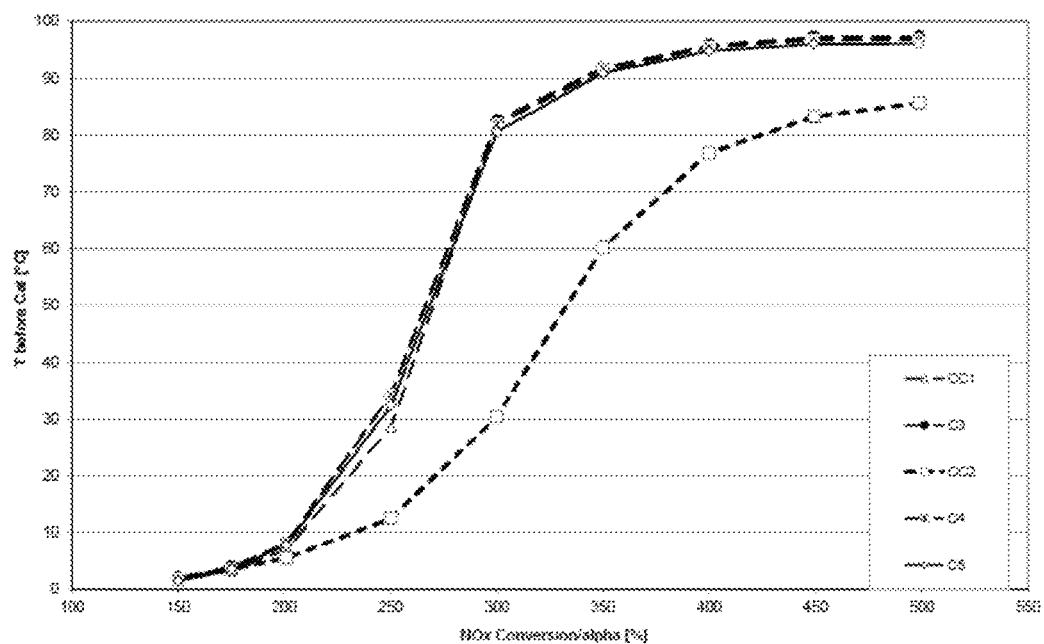

FIG. 10: the temperature difference ΔT between the temperature upstream of catalyst and the temperature downstream of catalyst when the catalyst has been laden with hydrocarbons before commencement of the measurement, after raising the reactor temperature/temperature upstream of catalyst to 400° C.: comparison of the exotherm produced by HC burnoff over the inventive catalysts C3-C5 (freshly prepared) or C3'-C5' (hydrothermally aged) and a catalyst according to the prior art (CC1 or CC1');

FIG. 11: the $NO_x$ conversion normalized to the α value over the freshly prepared catalysts CC1, CC2 (both prior art) and C3-C5 (inventive) in the non-hydrocarbon-containing exhaust gas;

FIG. 12: the $NO_x$ conversion normalized to the α value over the hydrothermally aged catalysts CC1', CC2' (both prior art) and C3'-C5' (inventive) in the non-hydrocarbon-containing exhaust gas.

Comparative Example 1

A coating suspension for a commercially available SCR catalyst based on iron-exchanged β-zeolite was produced. For this purpose, a commercial $SiO_2$ binder, a commercial boehmite binder (as coating aid, iron(III) nitrate nonahydrate and commercially available β-zeolite having a molar $SiO_2$/$Al_2O_3$ ratio (SAR) of 25 were suspended in water and, in a conventional dipping process, applied to a ceramic flow honeycomb having 62 cells per square centimeter and a cell wall thickness of 0.17 millimeter. The coated component was calcined first at 350° C. for 15 minutes, then at 500° C. for a period of 2 hours. The coating in the catalyst CC1 thus obtained consisted to an extent of 90% of β-zeolite and had an iron content, calculated as $Fe_2O_3$, of 4.5% by weight.

Comparative Example 2

An HC-resistant SCR catalyst according to WO 2009/135588 was produced. For this purpose, a commercially available, small-pore zeolite of the ferrierite type having a molar $SiO_2/Al_2O_3$ ratio (SAR) of 20 was slurried in water. Iron(III) nitrate nonahydrate was added to the suspension. After grinding, this suspension was used to coat a monolithic flow honeycomb having 62 cells per square centimeter and a cell wall thickness of 0.17 millimeter in a conventional dipping process. The coated component was calcined first at 350° C. for 15 minutes, then at 500° C. for 2 hours. This coating of the catalyst CC2 thus obtained consisted of ferrierite having an iron content of 4.5%, calculated as $Fe_2O_3$.

Example 1

A coating of commercially available, iron-exchanged β-zeolite according to comparative example 1 was applied to a further ceramic flow honeycomb having 62 cells per square centimeter and a cell wall thickness of 0.17 millimeter.

Then a further coating suspension comprising a commercially available ferrierite PER having a molar $SiO_2/Al_2O_3$ ratio (SAR) of 20 was prepared in water, which was used to coat the already singly coated flow honeycomb again by a conventional dipping process, such that the second layer of PER almost fully covered the first layer of β-zeolite on the exhaust gas side. After drying and calcination at 350° C. for 10 to 15 minutes and 500° C. for a period of 2 hours, the catalyst C1 was obtained. Two cylindrical drill cores having a diameter of 25.4 millimeters and a length of 76.2 millimeters were taken from each of the catalysts from the comparative examples and from example 1. The catalytic activity of each and every drill core was examined in the freshly prepared state (→CC1 or CC2 or C1). The other drill core in each case, before the study of catalytic activity, was subjected to synthetic aging in an oven in an atmosphere containing 10% by volume of water vapor and 10% by volume of oxygen in nitrogen at a temperature of 750° C. for a period of 16 hours (→CC1', CC2' and C1').

Study of Catalytic Activity:

A first test examined, as a measure of the HC resistance of the catalysts, the size of the exotherm generated over a catalyst laden with hydrocarbons under thermal stress. The conventional SCR catalyst according to the prior art CC1 was compared with inventive catalysts.

For this purpose, the freshly prepared drill cores of the catalysts were contacted with hydrocarbons on an engine test bed at 100° C. for a period of 60 minutes. Subsequently, the drill cores were preconditioned in a model gas system at reactor temperature 100° C. for 10 minutes (10% $O_2$, 10% $CO_2$, 5% $H_2O$, balance $N_2$, total flow rate 4 m³ (STP)/h). Then the reactor temperature was raised to 400° C. with the same gas mixture within 30 seconds. In order to obtain a measure of the exothermicity which had arisen, the temperatures of the exhaust gas were detected and evaluated 5 millimeters upstream of entry into the drill core and 76.2 millimeters downstream of exit from the drill core.

FIG. 1 shows, by way of example, the exhaust gas temperature 5 millimeters upstream of entry into the comparative catalyst CC1 and the measured exhaust gas temperature 76.2 millimeters beyond the comparative catalyst CC1. Shortly after raising the reactor temperature, from t=600 sec, a distinct exotherm is observed, which is reflected in a rise in the exhaust gas temperature downstream of catalyst to more than 800° C.

In order to be able to better compare the exotherms produced by the catalysts, inaccuracy in the temperature control was taken into account by forming the temperature difference ΔT between the temperature upstream of catalyst and the temperature downstream of catalyst. Here, T(upstream of catalyst) was the exhaust gas temperature 5 millimeters upstream of the drill core and T(downstream of catalyst) was the temperature of the exhaust gas 76.2 millimeters beyond the drill core. The temperatures were recorded at a time $t_{upstream\ of\ catalyst} = t_{max,\ upstream\ of\ catalyst}$ or $t_{upstream\ of\ catalyst} = t_{max,\ upstream\ of\ catalyst}$ when the temperature maximum upstream or downstream of the catalyst was present.

FIG. 2 shows the temperature differences measured over the freshly prepared catalysts CC1 and C1. While a temperature rise of 400° which is found over the comparative catalyst CC1 arises from catalytic combustion of zeolites stored in the catalyst after attainment of the ignition temperature for the hydrocarbon oxidation, a temperature rise of much less than 50° is observed over the inventive catalyst C1. This demonstrates that the inventive catalyst C1 stores a considerably lower level of hydrocarbons than the conventional SCR catalyst CC1 and hence has a higher HC resistance. The inventors believe that this is attributable to the fact that the top layer of FER present in the inventive catalyst prevents hydrocarbons from being stored in the β-zeolite beneath.

In further tests, the nitrogen oxide conversion with ammonia over the inventive catalysts and the comparative catalysts CC1 and CC2 was studied in the freshly prepared state and after hydrothermal ageing.

The study was effected in a steady-state test in a model gas system with the following gas concentrations:

| Model gas component: | Concentration: |
|---|---|
| NO | 550 ppmv |
| $NH_3$ | 450 ppmv |
| $O_2$ | 5% by vol. |
| $H_2O$ | 5% by vol. |
| $N_2$ | remainder |

The molar ratio of ammonia to the nitrogen oxides is usually defined as alpha in studies of SCR activity:

$$\alpha = \frac{c(NH_3)}{c(NOx)}$$

The gas concentrations listed in the table give an alpha value of α=0.85. The space velocity in the model gas tests conducted was 30 000 h⁻¹.

The $NO_x$ conversions measured are reported in the context of this document in a form normalized to the α value, i.e. as $NO_x$ conversion/α value.

FIG. 3 shows the $NO_x$ conversion normalized to the α value for the freshly prepared catalysts CC1, CC2 and C1. As can be inferred from FIG. 3, the inventive catalyst C1 shows slight disadvantages in the low-temperature range compared to the conventional SCR catalyst CC1, especially at operating temperatures between 200 and 300° C. Above 300° C., however, the nitrogen oxide conversion performance of the inventive catalyst is entirely comparable to that of the conventional catalyst. Compared to the HC-resistant SCR catalyst according to the prior art CC2, the inventive catalyst C1 exhibits significantly better nitrogen oxide conversion performances over the entire temperature range.

Viewing the tests results together shows that the inventive catalyst C1 in the freshly prepared state has considerably higher SCR activities than HC-resistant SCR catalysts known to date in the prior art, and the HC resistance of the inventive catalyst is simultaneously much higher than the conventional, zeolite-based SCR catalysts according to the prior art (CC1).

FIG. 4 snows the nitrogen oxide conversions normalized to the α value for the hydrothermally aged catalysts CC1', CC2 and C'. The inventive catalyst shows conversion rates comparable to the conventional SCR catalyst CC1. Compared to the HC-resistant SCR catalyst according to the prior art. CC2, the hydrothermal ageing stability of the inventive catalyst C1 is found to be much improved, which leads to a significantly higher nitrogen oxide conversion performance after hydrothermal ageing.

Example 2

A coating of commercially available, iron-exchanged β-zeolite according to comparative example 1 was applied to a further ceramic flow honeycomb having 62 cells per square centimeter and a cell wall thickness of 0.17 millimeter.

In further steps, the already singly coated honeycomb was impregnated in a dipping process with a solution of tetraethoxysilane (TEOS) in ethanol until the amount of silane absorbed corresponded to 4.3 g/l $SiO_2$, based on the volume of the honeycomb. After drying in a Leister blower at 50° C. and calcination at 350° C. for a period of 10 to 15 minutes and 500° C. for a period of 2 hours, the catalyst. C2 was obtained. Two drill cores having a diameter of 25.4 millimeters and a length of 76.2 millimeters were taken from the catalyst, one of which was subjected to synthetic ageing in an oven in an atmosphere containing 10% by volume of water vapor and 10% by volume of oxygen in nitrogen at a temperature of 750° C. for a period of 16 hours (→C2'). The drill cores C2 (freshly prepared) and C2' (hydrothermally aged) were then subjected to the above-described studies of catalytic activity.

FIG. 5 shows the exotherms produced over the inventive catalyst from example 2 in the freshly prepared state (C2) and in the aged state (C2') in the course of heating after loading with hydrocarbons compared to the conventional SCR catalyst CC1 (freshly prepared) or CC1' (hydrothermally aged). In the freshly prepared state, the inventive catalyst C2 exhibits an exotherm more than 250° lower than the comparative catalyst. Even after hydrothermal ageing, the exotherm produced over the inventive catalyst is more than 15° lower. The fact that the SCR catalyst according to the prior art (CC1) also exhibits a significantly lower exotherm after hydrothermal ageing is attributable to the fact that damage to the catalytically active sites has occurred with the ageing, and this also adversely affects the capacity for catalytic hydrocarbon combustion. Overall, the inventive catalyst C2 is thus found to be much more HC-resistant than the conventional SCR catalyst.

FIG. 6 shows the $NO_x$ conversion normalized to the α value for the freshly prepared catalysts CC1, CC2 and C2. It is clearly evident that the inventive catalyst C2 has a significant improvement in SCR activity over the entire temperature range compared to the HC-resistant catalyst according to the prior art CC2. Compared to the conventional SCR catalyst, K2 in the non-hydrocarbon-containing exhaust gas shows slight disadvantages in the low-temperature range with simultaneously improved conversion within the high-temperature range from 400° C., Example 3

A coating of commercially available, iron-exchanged β-zeolite according to comparative example 1 was applied to a further ceramic flow honeycomb having 62 cells per square centimeter and a cell wall thickness of 0.17 millimeter.

Subsequently, the honeycomb thus coated, after being dipped in dilute nitric acid, was impregnated with a solution containing 15% by weight of tetraethoxysilane (TEOS), 5% by weight of water and 80% by weight of ethanol, dried and calcined at 350° C. for a period of 10 to 15 minutes and 500° C. for a period of 2 hours. This afforded the catalyst C3.

Example 4

A coating of commercially available, iron-exchanged β-zeolite according to comparative example 1 was applied to a further ceramic flow honeycomb having 62 cells per square centimeter and a cell wall thickness of 0.17 millimeter.

Subsequently, the honeycomb thus coated was impregnated with a solution containing 15% by weight of tetraethoxysilane (TEOS), 5% by weight of water and 80% by weight of ethanol, dried and calcined at 350° C. for a period of 10 to 15 minutes and 500° C. for a period of 2 hours. This afforded the catalyst C4.

As well as drill cores to study the HC resistance and the catalytic activity, samples were taken from the catalyst C4 for characterization of the catalytically active material. By processes familiar to the person skilled in the art of optical analysis methods, a sample was taken from the originally prepared supported catalyst C4 and wholly embedded in transparent resin. A thin section sample separated therefrom was examined in a high-resolution transmission electron microscope with integrated energy-dispersive X-ray spectroscope (EDX=energy-dispersive X-ray spectroscopy). FIG. 7 shows a representative detail from the sample. Evident therein are surface spheres of silicon dioxide (1; EDX: 51.84 atom % O; 48.16 atom % Si) deposited on iron-exchanged zeolite particles (A; EDX; 57.84 atom % O; 2.59 atom % Al; 39.18 atom % Si; 0.4 atom % Fe). In addition, iron oxide is present in the sample material as well as the iron-exchanged zeolite (B; EDX 55.78 atom % O; 0.93 atom % Na; 8.48 atom % Al, 24.05 atom % Si; 0.51 atom % Cl; 10.26 atom % Fe), this resulting from excess iron compounds added for ion exchange during the preparation of the commercially available zeolite used.

For the further characterization of the catalytically active material, a small amount thereof was isolated by mechanical removal from the support body. The resulting powder was likewise examined with the aid of transmission electron microscopy and energy-dispersive X-ray spectroscopy. FIGS. 8 and 9 show detailed sections from the sample material. In FIG. 8, silicon dioxide is evident in the circular region marked, which has the feature of no apparent long-range order (crystal lattice planes). This demonstrates that the $SiO_2$ present in the inventive catalyst is amorphous and thus differs from conventional silicon dioxide materials as can, for example, be purchased commercially, ground and coated onto a support body in conventional dipping processes. FIG. 9 shows another detail from the sample. In the region marked "A", iron-exchanged zeolite is present. This has clear long-range order with a crystal lattice plane spacing of about 1.1 nanometers.

Example 5

A coating of commercially available, iron-exchanged β-zeolite according to comparative example 1 was applied to a further ceramic flow honeycomb having 62 cells per square centimeter and a cell wall thickness of 0.17 millimeter.

Subsequently, the honeycomb thus coated was impregnated with a solution containing 15% by weight of tetraethoxysilane (TEOS), 35% by weight of water and 50% by weight of ethanol until an amount of silane corresponding to 6.6 g/l $SiO_2$ had been applied. After drying and calcination at 350° C. for a period of 10 to 15 minutes and 500° C. for a period of 2 hours, the catalyst C5 was obtained.

Two drill cores having a diameter of 25.4 millimeters and a length of 76.2 millimeters were each taken from the catalysts from examples 3 to 5, each of which was subjected to synthetic ageing in an oven in an atmosphere containing 10% by volume of water vapor and 10% by volume of oxygen in nitrogen at a temperature of 750° C. for a period of 16 hours. The drill cores C3, C4 and C5 (freshly prepared) and C3', C4' and C5' (aged) were then subjected to the above-described studies of catalytic activity.

FIG. 10 shows a comparison of the exotherms observed when the temperature was increased over the catalysts from examples 3 to 5 laden with hydrocarbons with the conventional SCR catalyst from comparative example 1 in the freshly prepared state and in the aged state. All the inventive catalysts, both in the freshly prepared state and in the hydrothermally aged state, show considerably lower exotherms, if any at all (1), caused by hydrocarbon burnoff. They consequently likewise feature a distinct improvement in HO resistance.

FIG. 11 shows the $NO_x$ conversions normalized to the α value for the inventive catalysts C3-C5 compared to the HC-resistant SCR catalyst according to the prior art CC2 in the freshly prepared state. All the inventive catalysts feature distinct improvements in nitrogen oxide conversion over the entire temperature range compared to the HC-resistant catalyst according to the prior art.

FIG. 12 shows the $NO_x$ conversions normalized to the α value for the inventive catalysts C3'-C5' compared to the SCR catalysts according to the prior art CC1' and CC2' in the hydrothermally aged state. All the inventive catalysts feature much higher nitrogen oxide conversions over the entire temperature range and hence a significant improvement in ageing stability compared to the HC-resistant catalyst according to the prior art CC2'. The ageing stability of the inventive catalysts corresponds to that of the conventional non-HC-resistant SCR catalyst CC1.

Entirely analogously to example 4, it is also possible to obtain catalysts having good HC resistance combined with good catalytic activity by using solutions of the compositions described in examples 5 to 9 which follow for the impregnation of the Fe-beta coated honeycombs,

| Example | Type of silane | Proportion of silane | Proportion of water | Proportion of ethanol |
|---|---|---|---|---|
| 6 | N-(2-aminoethyl)-3-aminopropyltrimethoxysilane | 16% | 3.75% | 80.2% |
| 7 | Diisobutyldimethoxysilane | 14.7% | 2.5% | 82.8% |
| 8 | Phenyltriethoxysilane | 17.3% | 3.75% | 78.9% |
| 9 | Methacryloyloxypropyltrimethoxysilane | 17.9% | 3.75% | 78.4% |
| 10 | Triethoxyoctylsilane | 19.9% | 3.75% | 76.3% |

Example 11

A coating of commercially available, iron-exchanged β-zeolite according to comparative example 1 was applied to a further ceramic flow honeycomb having 62 cells per square centimeter and a cell wall thickness of 0.17 millimeter.

Then a further coating suspension comprising a commercially available fumed silica, the primary particle of which has a $d_{50}$ of the particle size distribution of 12 nm, was prepared in water, the $d_{50}$ of the particle size distribution of the fumed silica being understood to mean that 50% of the total volume of the fumed silica contains only those particles whose diameter is less than or equal to the value reported as $d_{50}$. This suspension was used to coat the already singly coated flow honeycomb again by a conventional dipping process. After drying and calcination at 350° C. for 10 to 15 minutes and 500° C. for a period of 2 hours, a catalyst whose second layer of $SiO_2$ almost fully covered the first layer of β-zeolite on the exhaust gas side was present.

Entirely analogously to example 11, it is also possible to obtain catalysts having good HC resistance combined with good catalytic activity by using coating suspensions composed of fumed silicas with other particle size distributions for the application of the second layer of $SiO_2$ which almost fully covers the first layer of β-zeolite on the exhaust gas side:

Example 12

Fumed silica with $d_{50}$=40 nm

Example 13

Fumed silica with $d_{50}$=20 nm

Example 14

Fumed silica with $d_{50}$=16 nm

Example 15

Fumed silica with $d_{50}$=14 nm

Example 16

Fumed silica with $d_{50}$=7 nm

Example 17

A coating suspension was prepared from a commercially available ZSM-5 zeolite. For this purpose, iron(III) nitrate nonohydrate and commercially available ZSM-5 zeolite having a molar $SiO_2/Al_2O_3$ ratio (SAR) of 25 were suspended in water and applied by a conventional dipping process to a ceramic flow honeycomb having 62 cells per square centimeter and a cell wall thickness of 0.17 millimeter. The coated component was calcined first at 350° C. for 15 minutes, then at 500° C. for a period of 2 hours. The coating in the catalyst thus obtained had an iron content, calculated as Fe$_2$O$_3$, of 4.5% by weight.

Subsequently, the honeycomb thus coated was impregnated with a solution containing 15% by weight of tetraethoxysilane (TEOS), 5% by weight of water and 80% by weight of ethanol, dried and calcined at 350° C. for a period of 10 to 15 minutes and 500° C. for a period of 2 hours.

Entirely analogously to example 17, it is also possible to obtain catalysts having good HC resistance combined with good catalytic activity, by virtue of the first catalytically active coating applied directly to the support body comprising the transition metal (TM)-exchanged zeolites listed in the following table:

| Example | TM salt | Zeolite type | SAR | Proportion of TM oxide |
|---|---|---|---|---|
| 18 | Copper(II) nitrate trihydrate | ZSM-5 | 25 | 2.5% CuO |
| 19 | Manganese(II) nitrate heptahydrate | ZSM-20 | 2.5% | 3% MnO |
| 20 | Tetraamminepalladium nitrate | US-Y | 12 | 0.1% PdO |
| 21 | Silver nitrate | US-Y | 12 | 1% Ag2O |
| 22 | Cerium nitrate hexahydrate | MOR | 20 | 3.5% CeO2 |

All examples show that it has been possible to provide SCR catalysts having a distinct improvement in HC resistance compared to conventional zeolitic SCR catalysts, and these can simultaneously achieve considerably higher nitrogen oxide conversion performances than with the HC-resistant SCR catalysts known to date in the prior art.

The invention claimed is:

1. A catalyst for the selective catalytic reduction of nitrogen oxides with ammonia in exhaust gases comprising hydrocarbons, comprising:
a support body;
a first catalytically active coating which has been applied directly to the support body and comprises a zeolite exchanged with one or more transition metals and/or a zeolite-like compound exchanged with one or more transition metals, and
a second coating which covers the first coating on the exhaust gas side and is configured so as to prevent the contact of hydrocarbons having at least three carbon atoms present in the exhaust gas with the first coating beneath, without blocking the passage of nitrogen oxides and ammonia to the first coating, and comprises
one or more small-pore zeolites and/or small-pore zeolite-like compounds selected from the group consisting of SAPO-34, CHA, FER, ERI, OFF, ALPO-34 and mixtures thereof or
one or more oxides selected from the group consisting of silicon dioxide, germanium dioxide, aluminum oxide, titanium dioxide, tin oxide, cerium oxide, zirconium dioxide and mixed oxides thereof.

2. The catalyst as claimed in claim 1, wherein the transition metal-exchanged zeolite and/or the transition metal-exchanged zeolite-like compound present in the first catalytically active coating applied directly to the support body is selected from the group consisting of beta-zeolite, ZSM-5, ZSM-20, USY, MOR or mixtures thereof, the transition metal being selected from the group consisting of cerium, manganese, iron, copper, silver, gold, platinum, palladium and/or mixtures thereof.

3. The catalyst as claimed in claim 1, wherein the second coating consists of one or more small-pore zeolites and/or small-pore zeolite-like compounds selected from the group consisting of SAPO-34, CHA, FER, ERI, OFF, ALPO-34 and mixtures thereof.

4. The catalyst as claimed in claim 3, wherein one or more of the small-pore zeolites and/or of the small-pore zeolite-like compounds have been exchanged with one or more transition metals selected from the group consisting of cerium, manganese, iron, copper, silver, gold, platinum, palladium and/or mixtures thereof.

5. The catalyst as claimed in claim 1, wherein the second coating consists of one or more oxides selected from the group consisting of silicon dioxide, germanium dioxide, aluminum oxide, titanium dioxide, tin oxide, cerium oxide, zirconium dioxide and mixtures thereof.

6. The catalyst as claimed in claim 1, wherein the d$_{50}$ of the particle size distribution of the oxides in the second coating is equal to or less than 100 nm, the d$_{50}$ of the particle size distribution of the oxides being understood to mean that 50% of the total volume of the oxides contains only those particles whose diameter is less than or equal to the value reported as d$_{50}$.

7. The catalyst as claimed in claim 1, wherein, the second coating comprises one or more oxides selected from the group consisting of silicon dioxide, germanium dioxide, aluminum oxide, titanium dioxide, tin oxide, cerium oxide, zirconium dioxide and mixed oxides thereof, and is produced by impregnating the support body already provided with the first coating with a solution comprising one or more alkoxides of the formula (I)

$$(RO)_{n-m}MeR'_m \qquad (I)$$

in which
n is 3 or 4 and m<n;
Me is silicon, germanium, aluminum, titanium, tin or zirconium;
R is (C$_1$-C$_4$)-alkyl or phenyl; and
R is (C$_1$-C$_8$)-alkyl, amino-(C$_1$-C$_4$)-alkyl, amino-(C$_1$-C$_4$)-alkyl whose amino group has been substituted by amino-(C$_1$-C$_4$)-alkyl, or (C$_1$-C$_4$)-alkyl methacrylate, and then drying.

8. The catalyst as claimed in claim 7, wherein R is methyl, ethyl, isopropyl, butyl or phenyl.

9. The catalyst as claimed in claim 7, wherein R' is amino-(C$_1$-C$_4$)-alkyl, N-(2-aminoethyl)-3-aminopropyl, isopropyl, isobutyl, phenyl, octyl or (C$_1$-C$_4$)-alkyl methacrylate.

10. The catalyst as claimed in claim 1, wherein the second coating consists of silicon dioxide.

11. The catalyst as claimed in claim 10, wherein the second coating of silicon dioxide is produced by applying an aqueous suspension of fumed silica having primary particles having a d$_{50}$ of the particle size distribution equal to or less than 100 nm to the support body already provided with the first coating, the d$_{50}$ of the particle size distribution of the fumed silica being understood to mean that 50% of the total volume of the fumed silica contains only those particles whose diameter is less than or equal to the value reported as d$_{50}$.

12. The catalyst as claimed in claim 11, wherein the fumed silica has a halide- and/or hydroxide-modified surface and crosslinking of the silica particles in the resulting layer is produced by hydrolysis and/or condensation.

13. A process for reducing the level of nitrogen oxides, comprising nitrogen monoxide and nitrogen dioxide, in hydrocarbon-containing diesel engine exhaust gases, comprising the process steps of:

adding ammonia or a precursor compound decomposable to ammonia as a reducing agent to the exhaust gas which comprises nitrogen oxides and hydrocarbons and is to be cleaned, and passing the resulting mixture of exhaust gas and reducing agent over a catalyst as claimed in claim 1.

14. The process as claimed in claim 13, wherein the exhaust gas, before the addition of ammonia or of a precursor compound decomposable to ammonia, is passed over an oxidation catalyst which is effective for conversion of at least some of the nitrogen monoxide present in the exhaust gas to nitrogen dioxide.

15. The process as claimed in claim 14, wherein the oxidation catalyst is in the form of a catalytically active coating on a monolithic flow honeycomb and/or on a wall flow filter substrate.

* * * * *